US005773118A

United States Patent [19]

Eisenpresser

[11] Patent Number: 5,773,118

[45] Date of Patent: Jun. 30, 1998

[54] DECORATIVE FABRIC AND METHOD FOR MAKING THE SAME

[76] Inventor: Marvin Eisenpresser, 4 Willow La., Hewlett Harbor, N.Y. 11557

[21] Appl. No.: 494,489

[22] Filed: Jun. 26, 1995

[51] Int. Cl.$^{6}$ .......... B32B 3/14

[52] U.S. Cl. .......... 428/79; 156/230; 156/238; 428/100; 428/914

[58] Field of Search .......... 428/224, 914, 428/79, 100; 156/230, 238

[56] References Cited

U.S. PATENT DOCUMENTS

| | | | |
|---|---|---|---|
| 5,136,726 | 8/1992 | Hellin et al. | 428/79 |
| 5,338,595 | 8/1994 | Li | 428/79 |
| 5,419,944 | 5/1995 | Sammis | 428/79 |

*Primary Examiner*—James J. Bell

*Attorney, Agent, or Firm*—Cobrin Gittes & Samuel

[57] ABSTRACT

The present invention provides a fabric having a decal and ornaments bonded and affixed, respectively thereto, whereby the ornaments overlap and have the same configuration as the decal so that the decal is no longer visible when the ornaments are affixed.

10 Claims, 3 Drawing Sheets

DECORATIVE FABRIC AND METHOD FOR MAKING THE SAME

SUMMARY OF THE INVENTION

The present invention relates to a fabric having an ornamental design formed by a decal and one or more ornaments having the configuration of the decal which are bonded and affixed, respectively, to the fabric. The ornaments overlay the decal so that the decal is not visible.

BACKGROUND OF THE INVENTION

Fabrics with decals and ornaments bonded and affixed, respectively, thereto are well known in the prior art. More specifically, ironing decals, embroidering and silkscreening designs onto fabric are not novel concepts.

Ornaments have been affixed to clothing, including hats and shoes, and other articles, such as bags, curtains and tablecloths. Ornaments have been affixed to make clothing more aesthetically pleasing and/or to add a new and different feature to already worn clothing.

The prior art, however, only discloses a fabric having a design which is formed by ornaments affixed without the use of a reference point, thereby creating a design which is not exact. The present invention provides a fabric having a design which is formed by utilizing a decal to guide the affixing of ornaments, thereby creating an exact and definite design. The decal prevents the ornaments from being misplaced on the fabric by providing the exact pinpoint site for affixing.

The present invention further provides a method of affixing ornaments on fabric for creating an exact and definite design where such method does not require expensive and heavy equipment. Additionally, the invention provides a method of affixing ornaments on fabric for creating an exact and definite design where such method is quicker and more efficient than the methods used in the prior art.

SUMMARY OF THE INVENTION

The present invention provides a fabric having a decal and one or more ornaments bonded and affixed, respectively thereto. The ornaments overlap and have the configuration of the decal so that the decal is not visible when the ornaments are affixed.

BRIEF DESCRIPTION OF THE DRAWINGS

The present invention, as described generally above, is described below in reference to a presently-preferred embodiment, which description is intended to be read in conjunction with the following set of drawings, in which.

DESCRIPTION OF THE PREFERRED EMBODIMENTS

The present invention provides a fabric having a decal and one or more ornaments bonded and affixed, respectively thereto, whereby the ornaments overlap and have the same configuration as the decal so that the decal is not visible when the ornaments are affixed. In one embodiment of the invention, a portion of the decal is visible.

Figure 1:
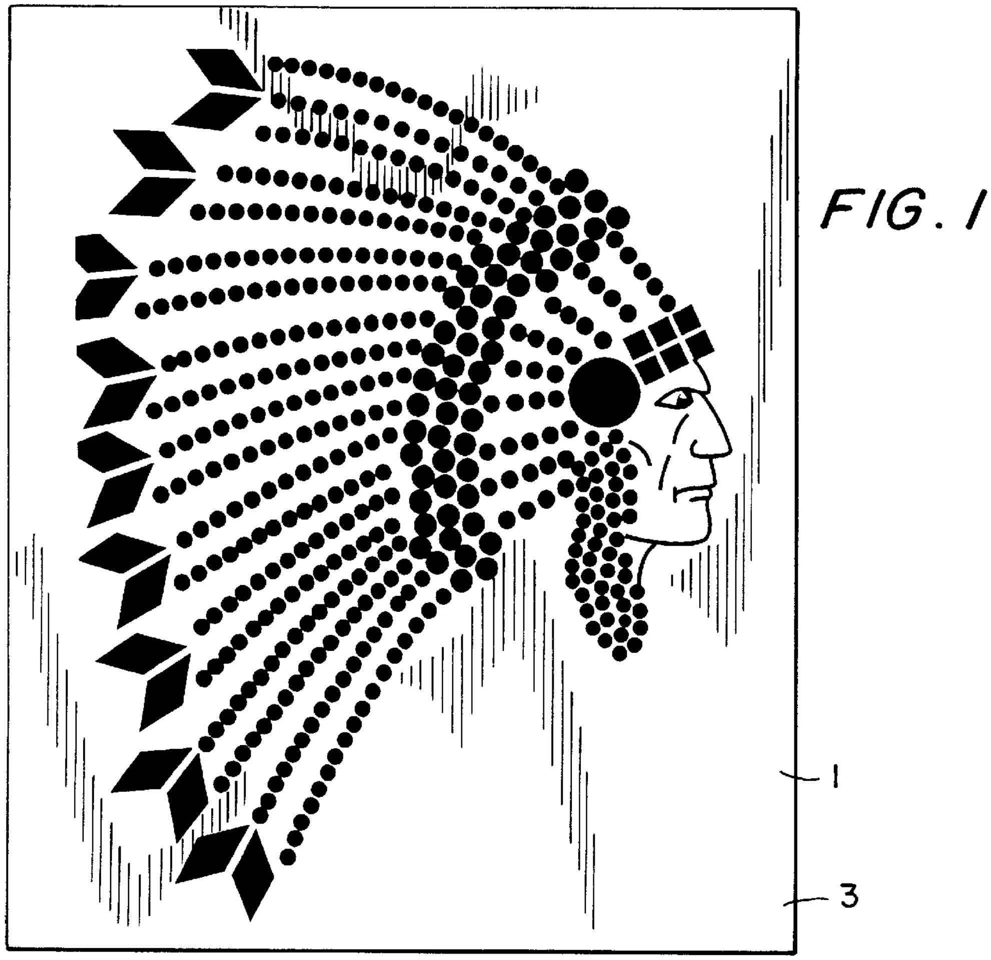
FIG. 1 is a front view of a decal adhered to a paper sheet.
Figure 2:
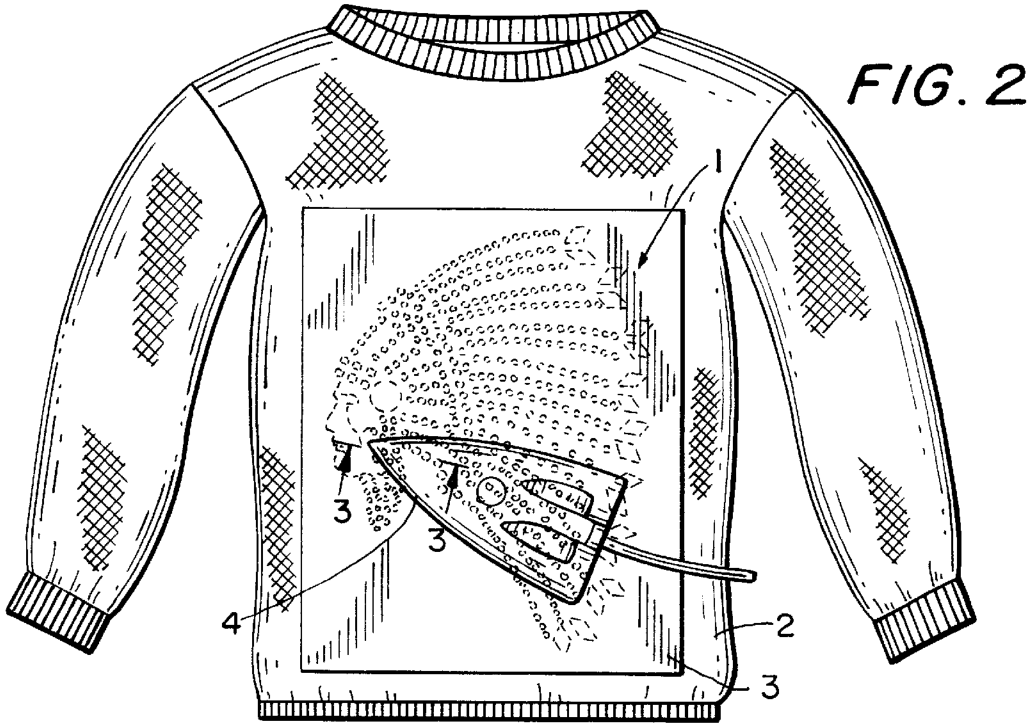
FIG. 2 is a front view of a decal being applied to a portion of a fabric through use of an iron.
Figure 3:
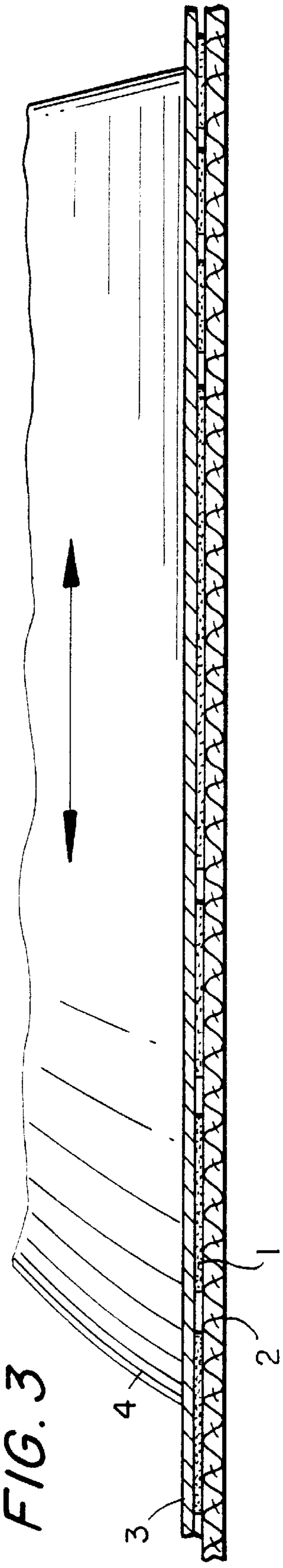
FIG. 3 is a side view of an iron being applied on a decal which is placed on a portion of a fabric.
Figure 4:
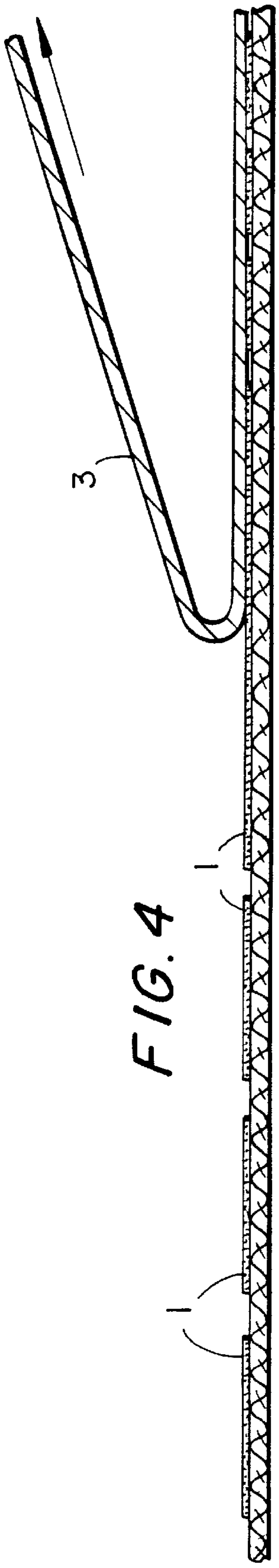
FIG. 4 is a side view of a paper sheet being peeled from a decal.
Figure 6:
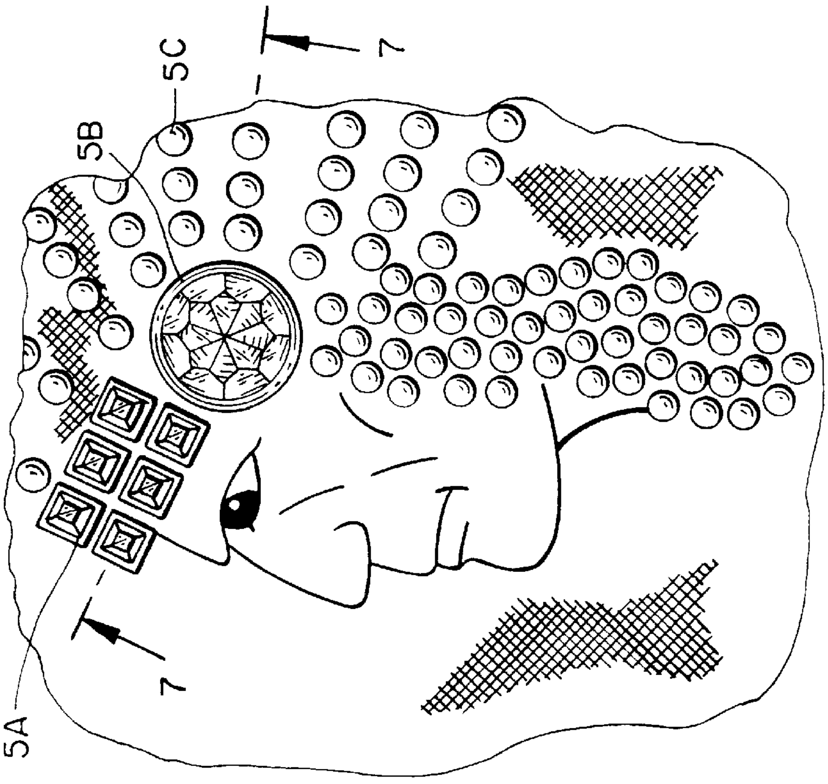
FIG. 6 is a front view of an ornament design on a portion of a fabric.

With reference to FIGS. 1 and 6, the present invention in part comprises a decal 1. Prior to being applied to a fabric 2, the decal 1 may be adhered to a sheet of paper 3. With reference to FIGS. 2 and 3, the decal 1 may be bonded to the fabric 2 through use of an iron 4. With reference to FIG. 4, the sheet of paper 3 is removed, while the decal 1 remains bonded to the fabric 2.

Figure 5:
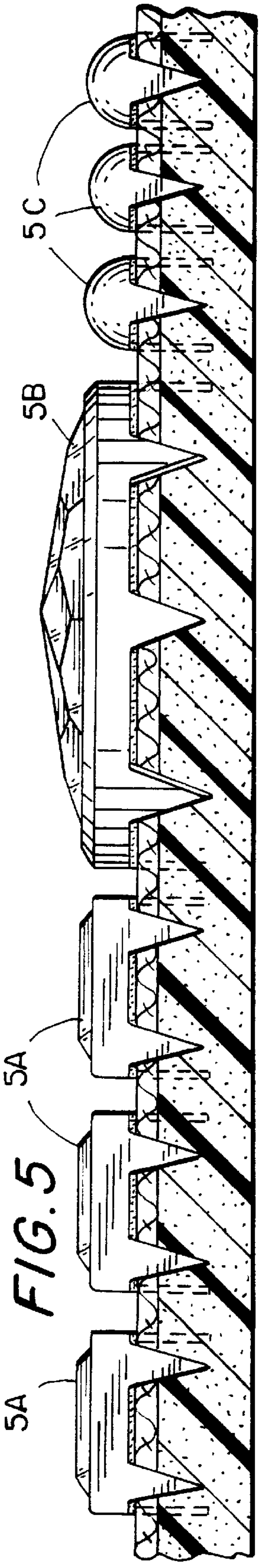
FIGS. 5 and 7 are side views of ornaments affixed to a portion of a fabric.
Figure 8:
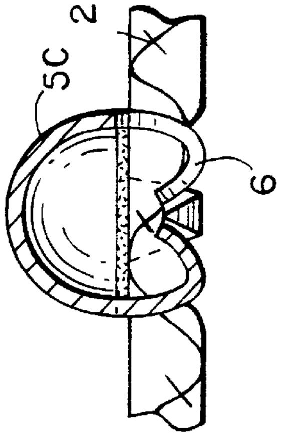
FIG. 8 is a cross-sectional side view of an ornament affixed to a portion of a fabric.
Figure 7:
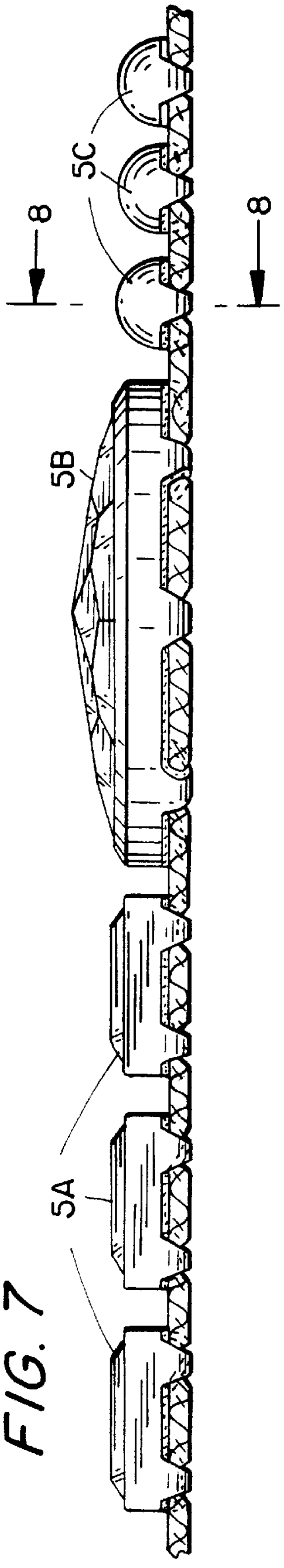

With reference to FIG. 5, ornaments 5A, 5B, 5C are affixed to the fabric 2 to create an ornament design. The decal 1 provides a guide for affixing the ornaments 5. Accordingly, the ornaments 5 which have the same configuration as the decal 1 overlay the decal 1 so that it is not visible. With reference to FIG. 8, the ornaments 5A, 5B, 5C may have hooks 6 for affixing themselves to the fabric 2.

The ornaments 5 may consist of a trinket 5A, a jewel 5B, a button, a bead 5C, or anything of the like. Additionally, the ornaments 5A, 5B, 5C may be formed of glass, plastic or metal.

The fabric 2 may be comprised of wool, leather, vinyl, plastic, cotton, polyester, silk, or any combination thereof.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. In combination, a decorative fabric with decal and at least one ornament comprising:

a fabric;

a decal bonded to said fabric; and at least one ornament affixed to said decal, said ornament overlaying and having the configuration of at least a portion of said decal so that said portion of said decal is hidden between said ornament and said fabric.

2. A combination in accordance with claim 1 wherein said fabric is a material selected from the group consisting of wool, leather, vinyl, plastic, cotton, polyester, silk, or any combination thereof.

3. A combination in accordance with claim 1 wherein said ornaments is selected from the group consisting of a trinket, a jewel, a button, and a bead.

4. A combination in accordance with claim 1 wherein said ornament is formed of a material selected from the group consisting of glass, plastic and metal.

5. A combination in accordance with claim 1 wherein said ornament has at least one hook for affixing to said fabric.

6. A combination in accordance with claim 1, further comprising a plurality of ornaments affixed on said fabric in an overlapping manner to hide said decal.

7. A method of affixing at least one ornament on fabric comprising:

a) positioning a decal on a fabric;

b) bonding said decal to said fabric;

c) affixing at least one ornament on said decal, said ornament overlaying and having the configuration of at least a portion of said decal so that said portion of said decal is hidden between said ornament and said fabric.

8. A method in accordance with claim 7 wherein said decal is adhered to a sheet of paper and step b) further comprises:

d) peeling said paper from said decal after said decal becomes bonded to said fabric.

9. A method in accordance with claim 7 wherein said bonding comprises ironing said decal onto said fabric.

10. A method in accordance with claim 7, further comprising the step of:

affixing a plurality of ornaments on said fabric in an overlapping manner to hide said decal.

* * * * *